March 17, 1931.  F. H. JACKSON  1,796,460
COMBINED FISH NET BUOY AND LIGHT
Filed Sept. 27, 1929
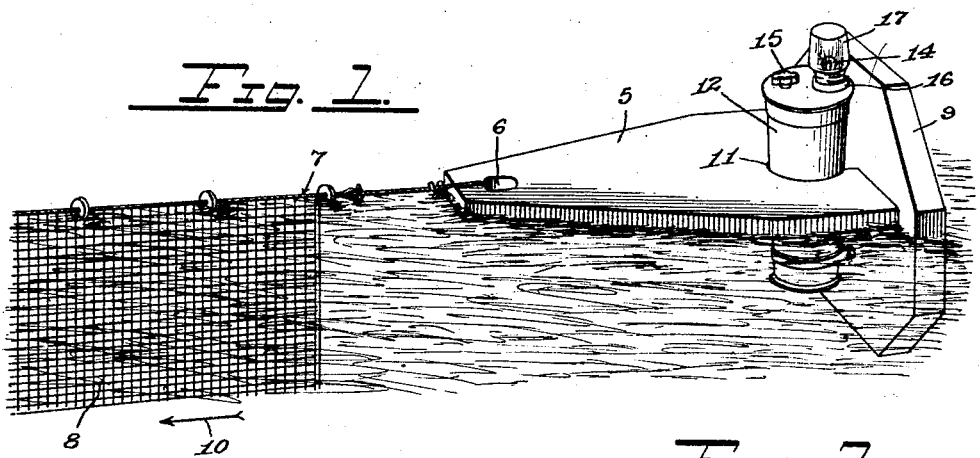
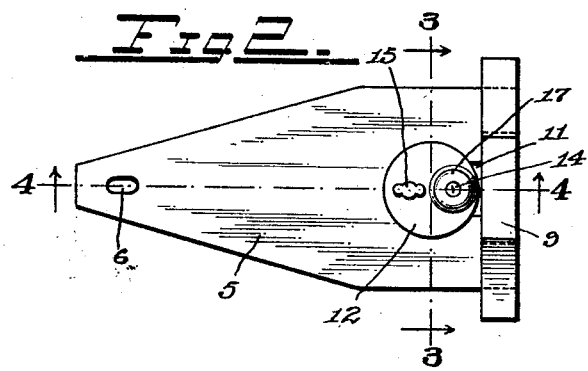
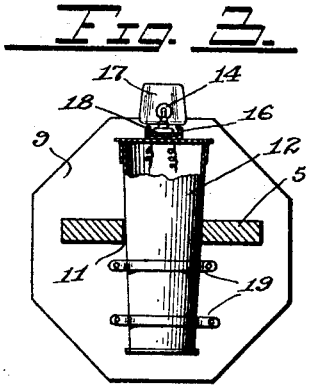
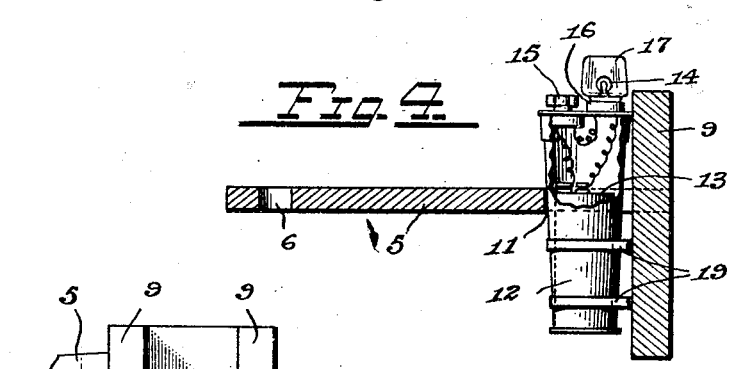
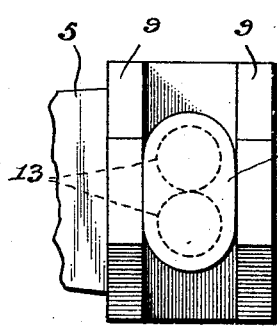
Inventor
*Frank H. Jackson*
By *John W. Maupin.*
Attorney Patented Mar. 17, 1931

1,796,460

UNITED STATES PATENT OFFICE

FRANK H. JACKSON, OF MOUNT VERNON, WASHINGTON

COMBINATION FISH-NET BUOY AND LIGHT

Application filed September 27, 1929. Serial No. 395,637.

My invention relates to combination fish net buoys and lights and certain objects of the invention are to provide a buoy comprising a float board adapted to be secured to an end of a floating fish net and a head board secured transversely to an end of said float board in an upright position whereby same will be partly submerged when placed in the water and will thereby serve as a resistance against movement through the water so that the net may be laid out in a stretched or taut position and will also serve to retain the float board in a somewhat stable position of equilibrium while floating on the water. Further objects are to provide a water-tight casing of non-corrosive metal such as copper or zinc having a dry cell or other electric generating element disposed therein with connections to a glass enclosed water-tight light on its top, and to mount said casing in an upright position through an aperture in the float board and in such proximity to the head board that same will serve as a fender or shield in protecting the light and its casing from damage by boats or other floating objects.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in perspective of the device secured to the cork line of a floating fish net;

Fig. 2 is a top plan view of the device;

Fig. 3 is a view in transverse vertical section taken substantially on a broken line 3, 3 of Fig. 2;

Fig. 4 is a view in longitudinal vertical section taken on a broken line 4, 4 of Fig. 2; and Fig. 5 is a top plan view of a slightly modified form.

Referring to the drawings throughout which like reference numerals designate like parts, the numeral 5 indicates the float board which may be tapered and provided at its smaller end with a hole 6 through which a line may be secured for fastening same to the cork line 7 of a floating fish net 8 as clearly shown in Fig. 1 of the drawings.

A head board 9, preferably made of relatively thick wood and in octagonal shape, is mortised or otherwise secured to the larger end of the float board 5 in an upright position and at right angles to the float board. Referring to Fig. 4 of the drawings it will be noted that a greater portion of the head board is disposed below the float board so that same will serve to retain the float board in a somewhat stable position of equilibrium when the device is placed in the water as shown in Fig. 1.

Again referring to Fig. 1, the net 8 is ordinarily laid out into the water over the stern of a boat that is moving in the direction indicated by the arrow 10. Assuming that the net is secured to the float board 5 it will be obvious that the greater portion of the head board 9 being under water will serve as a resistance against movement through the water and the net may therefore be placed in the water in an outstretched or taut position as will be understood.

An aperture 11 is provided through the float board 5 adjacent the head 9 and a water-tight casing 12 preferably made of copper or zinc is mounted upright in said aperture with its greater portion disposed below the float board. A dry cell 13 or the like is disposed within said casing and a light bulb 14 is mounted on the top thereof with circuit wires leading thereto from the cell and through a switch 15.

The connections for the light 14 and switch 15 are sealed through the top of the casing 12 making same water-tight throughout. An annular flanged member 16 similar to the metal screw top of a glass jar is inverted and secured to the top of the casing at the base of the electric bulb. A glass globe 17 is screwed into said flanged member with a rubber gasket 18 interposed therebetween. Said globe may be an ordinary glass jar and the rubber gasket provides a water-tight connection for the globe.

The light 14 projects above the head 9 so that same is visible from all directions. The cell 13 is disposed below the line of flotation and will therefore help to retain the device in stable equilibrium. Metal straps 19 or the like may be used for securing the casing 12 to the head 9 if desired. Two of such heads are used in the modified form shown in Fig. 5 and the casing 12 is formed to accommodate two dry cells. This form may be used where a stronger light is needed and also where a more rigid construction is desirable.

Having thus described my invention, it being understood that minor changes may be resorted to in its construction without departing from its scope and spirit, what I claim and desire to secure by Letters Patent of the United States is:—

1. A combination fish net buoy and light comprising a float board having a tapered end portion, a head board secured transversely to the other end of the float board, means for securing said float board to a fish net, a water-tight casing mounted in an aperture of the float board adjacent the head board, an electric cell within the casing, and a light on the top of the casing connected with the cell and projecting above the head board.

2. The combination with a floating fish net of a combination fish net buoy and light comprising a float board, means for securing the float board to the net, a head board secured transversely to the remote end of the float board, a water-tight casing mounted in an aperture of the float board in juxtaposition with the head board having an electric cell therein, and a water-tight glass enclosed light on the top of the casing connected with the cell and projecting above the head board.

In witness whereof, I hereunto subscribe my name this 9th day of August, A. D. 1929.

FRANK H. JACKSON.